COMMUNICATION SYSTEM LINE FAULT LOCATING

Filed Sept. 30, 1948 5 Sheets-Sheet 1

Inventor,
William Henry Bernard Cooper,
by Hall + Houghton,
Attorneys.

Sept. 16, 1952 W. H. B. COOPER 2,611,041

COMMUNICATION SYSTEM LINE FAULT LOCATING

Filed Sept. 30, 1948 5 Sheets-Sheet 2

*Inventor,*
*William Henry Bernard Cooper,*
*by Hall & Houghton,*
*Attorneys.*

Sept. 16, 1952 W. H. B. COOPER 2,611,041

COMMUNICATION SYSTEM LINE FAULT LOCATING

Filed Sept. 30, 1948 5 Sheets-Sheet 3

Inventor,
William Henry Bernard Cooper,
by Hall + Houghton
Attorneys.

Inventor,
William Henry Bernard Cooper,
by Hall & Houghton,
Attorneys.

COMMUNICATION SYSTEM LINE FAULT LOCATING

Filed Sept. 30, 1948 5 Sheets-Sheet 5

Inventor,
William Henry Bernard Cooper,
by Hall & Houghton,
Attorneys.

UNITED STATES PATENT OFFICE 2,611,041

COMMUNICATION SYSTEM LINE FAULT LOCATING

William Henry Bernard Cooper, Middlesex, England

Application September 30, 1948, Serial No. 52,010
In Great Britain October 3, 1947

12 Claims. (Cl. 179—175.31)

This invention relates to communication systems of the type which comprises terminal stations and intermediate amplifier stations between the terminal stations.

It is known, in such systems, to locate the position of a fault in an electric cable by means of the reflection of electro-magnetic energy from a fault but when such technique is employed with long cables attenuation of the reflected signal limits the distance at which a fault can be reasonably closely located.

An object of the invention is to provide an improved method and means whereby the position of a fault in the transmission medium which may be, for example, a submarine cable, may be located.

According to the invention a method of locating a fault in a cable in a communication system having terminal stations and intermediate amplifying means between the terminal stations and which is arranged so that frequencies above a predetermined frequency are transmissible along the system in one direction and frequencies below a predetermined frequency are transmissible along the system in the opposite direction comprises transmitting from a terminal station and through intermediate amplifying means a pulse of a determined frequency and providing for energy reflected from a fault consequent upon the transmission of a pulse at said determined frequency to be introduced to intermediate amplifying means at a frequency which is such that the reflected energy after amplification by said last mentioned intermediate amplifying means is enabled to pass along the system towards said transmitting terminal station.

Further, according to the invention, a communication system having terminal stations and at least one intermediate amplifier station comprises means for directing the passage of carrier frequencies above a predetermined value through the system in one direction and means for directing the passage of carrier frequencies below a predetermined value through the system in the opposite direction comprises means at a terminal station for transmitting a pulse of a determined frequency along the system, frequency changing means disposed between the said directing means at an intermediate amplifier and the next succeeding directing means, means for placing said frequency changing means at will in circuit in the system whereby a signal reflected from a fault in the transmission medium consequent upon the transmission of a pulse at said determined frequency is enabled to pass back to the transmitting terminal station through any amplifier station disposed between the fault and the transmitting terminal station and means at said terminal station adapted, in dependence on the reception of the reflected signal, to enable the position of the fault to be located.

The transmitting terminal station may be provided with means for transmitting either a single pulse of a determined frequency or a number of pulses of different determined frequencies simultaneously.

By the invention not only is a pulse transmitted to a fault via an intermediate amplifier station amplifier but the resulting reflected signal is also amplified. By this amplification of the transmitted and reflected energy, the limitation as to the distance over which a fault can usefully be located is largely removed.

Where the system includes a submarine cable, the invention further provides means for maintaining the essential part of the cable working during the location of a fault in the cable by arranging that the power fed to an intermediate amplifier is conducted by one of the cable conductors which includes the valve heaters for the amplifier valves and obtaining anode currents for the valves from the voltage drop across the said heaters.

The valve heaters may be arranged in series with a resistance if desired and the voltage drop across both heaters and resistance used to provide the high tension supply for the amplifier.

Both terminal stations may be provided with means for transmitting pulses, one station being arranged to transmit a pulse of determined frequency and the other station to transmit simultaneously pulses of different determined frequencies.

According to a further feature of the invention means are provided at a transmitting terminal station for measuring the time delay between the transmission of a pulse, or pulses, and the reception of the amplified reflected signal.

The invention still further provides means whereby, in addition to the reflected signal, an additional signal is received from each amplifier station consequent upon the transmission of a pulse or pulses and means at the transmitting station whereby the time delay between the reception of the additional and reflected pulses may be measured.

The invention is illustrated by way of example in the accompanying drawings in which.

Figure 1:
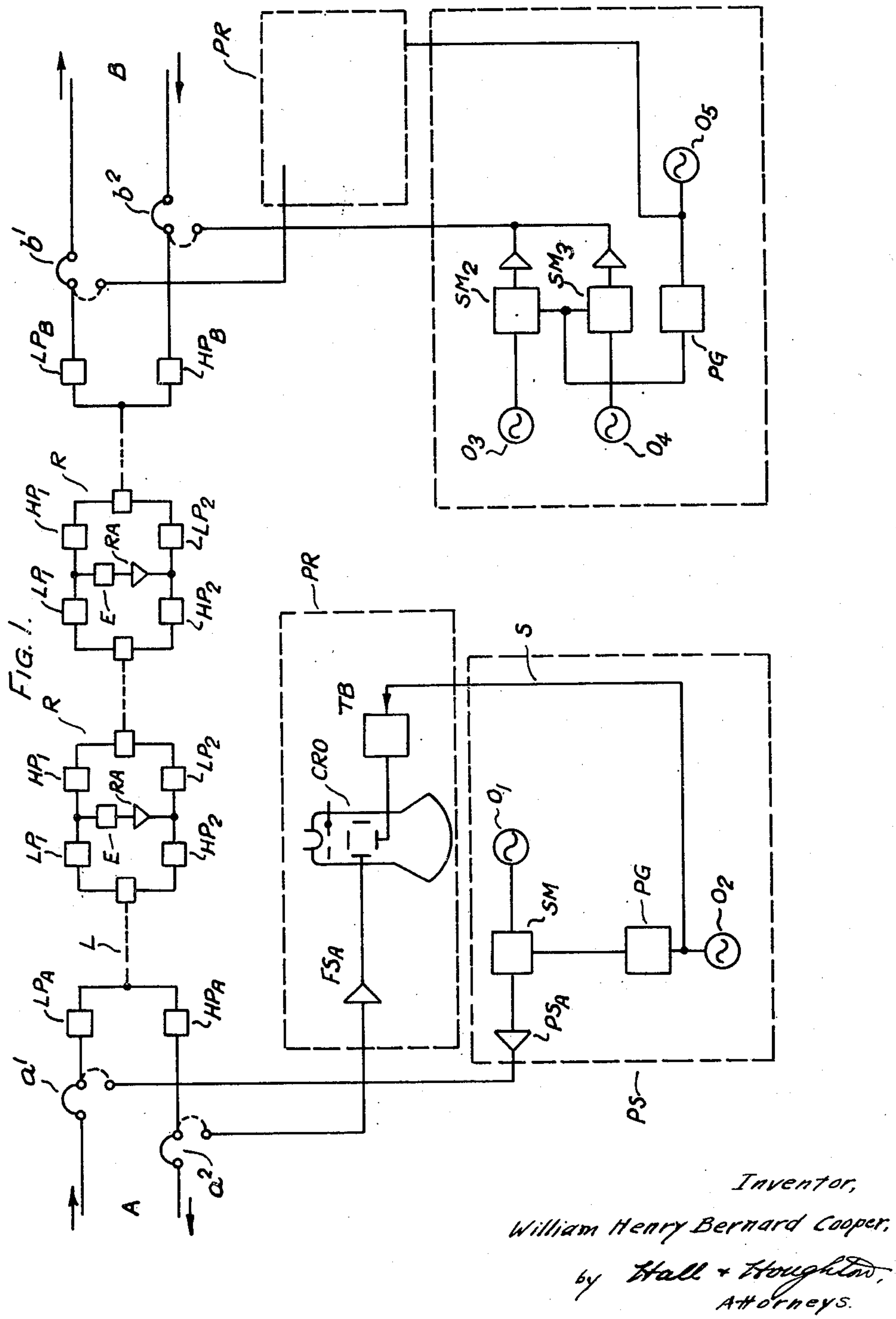
Fig. 1 is a block schematic diagram of a two band communication system employing a number of intermediate amplifiers in tandem.

Referring to the drawings, a terminal station at A is connected via a line L with a terminal station at B through intermediate amplifiers RA of repeaters R. With the exception of the pulse transmitting means, the pulse receiver and measuring apparatus at the terminal stations and the non-linear device which is to function as a frequency changer at the intermediate amplifier stations to be described below, the terminal stations A and B and the intermediate amplifiers RA each with their associated filter networks $LP_1$, $LP_2$ and $HP_1$ and $HP_2$ and attenuation equalizers E are of known type and conventional in design. A description of a system of the type indicated in Fig. 1 is given in a paper "Modern submarine cable telephony and the use of submerged repeaters" published in the Journal of the Institution of Electrical Engineers, part III dated December 1944. While two repeaters R only are shown in Fig. 1 any other number may be employed.

In the system shown in Fig. 1 signals transmitted in normal operation by station A are confined to a lower band, say between 12 and 60 kilocycles per second, of the available frequency spectrum while the signals normally transmitted by station B are confined to the upper band of the spectrum say between 72 and 120 kilocycles per second. The signals transmitted by station A pass to line L via low-pass filter LPA and through each successive repeater in turn via low-pass filters $LP_1$ and $LP_2$ and to station B via low-pass filter LPB these low-pass filters having a cut-off frequency of 60 kilocycles per second. Similarly signals transmitted by station B pass to line L via high-pass filter HPB, through the repeaters via high-pass filters $HP_1$ and $HP_2$ and to station A via high-pass filter HPA, these high-pass filters having a cut-off frequency of 72 kilocycles per second.

In practice the intermediate amplifiers RA are designed to possess a high degree of linearity of amplitude characteristic in order to avoid the production of undesirable intermodulation noise on the system.

The apparatus provided and shown in schematic form in Fig. 1 includes at station A, a pulse sender included in the rectangle shown in broken lines and marked PS, a pulse receiver in the broken line rectangle PR, and switches *a1a2*. The switches *a1a2* are shown by solid lines in the position they occupy when the system is in normal operation for the transmission of signals from station A to station B and from station B to station A. When the position of a fault in the cable is to be located the switches *a1a2* are moved to the position shown in broken lines when switch *a1* connects the pulse sender PS with the line L and switch *a2* connects the line with the pulse receiver PR.

Figures 3, 5, 7:
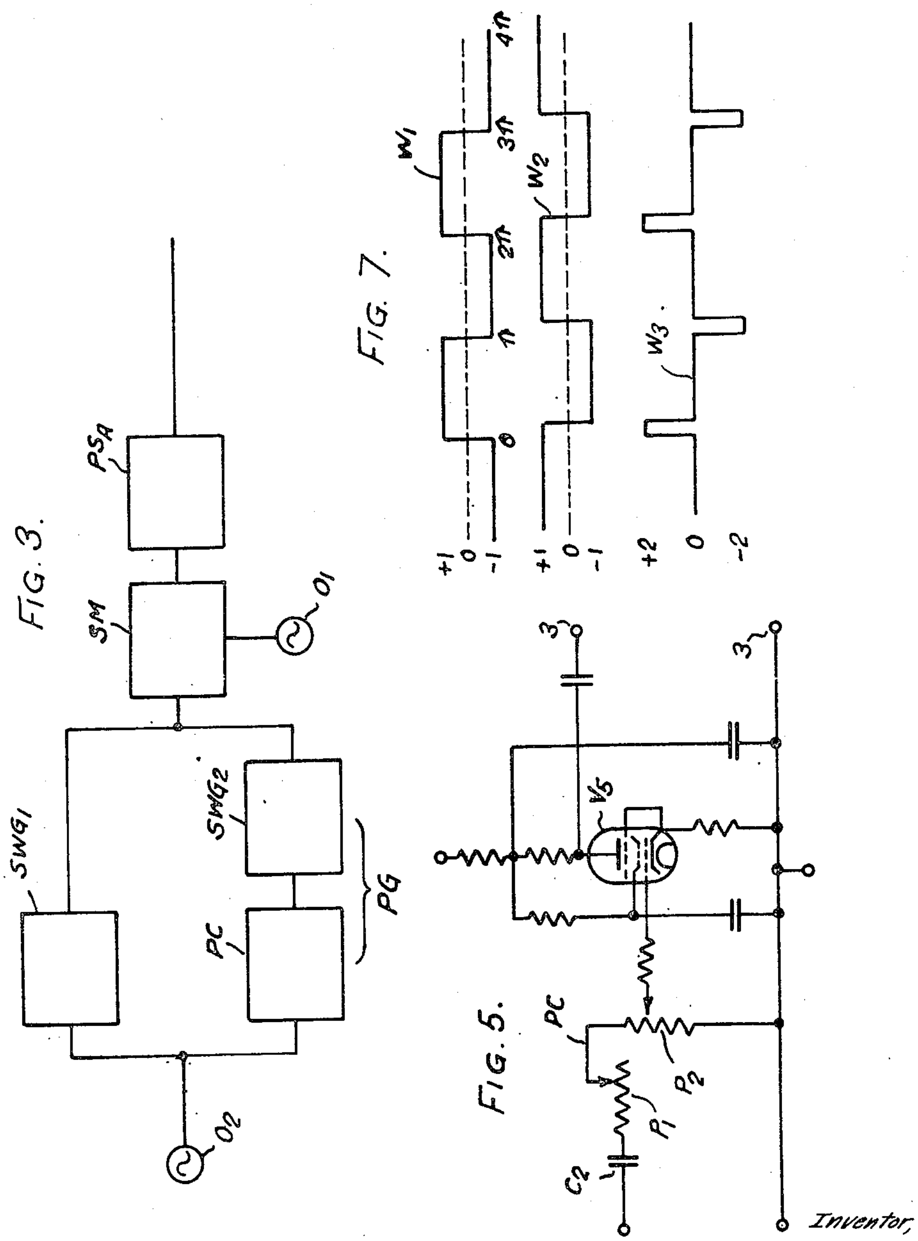
Fig. 3 is a block schematic diagram of pulse generating and transmitting equipment.
Fig. 5 shows a circuit arrangement of a phase changer.
Fig. 7 illustrates the rectangular pulse produced by the pulse generator.

During test, with the switches *a1a2* in their broken line positions the pulse sender PS is arranged to transmit a train of pulses of, in this instance, 30 kilocycles per second carrier frequency. Each pulse is of approximately 50 microseconds duration and the pulses are repeated at the rate of a 100 per second. As will be described below the pulse sender PS at station A comprises two oscillators $O_1$ and $O_2$ producing respectively sine waves of 30 kilocycles and 100 cycles per second. The pulse sender PS at station A also comprises a pulse generator PG and a switching modulator SM. The pulse generator PG comprises, as indicated in Fig. 3, a phase changer PC and two square wave generators $SWG_1$ and $SWG_2$.

The pulse receiver at station A comprises a frequency selective amplifier FSA and a conventionally arranged cathode ray oscillograph CRO and time base circuit TB, the oscillograph suitably using Y plate deflection on a linear time base to display the signals received from the line L. A time base synchronising signal is supplied to the time base circuit TB from the oscillator in the pulse sender PS over the line S.

The 30 kilocycle per second pulses are transmitted from station A towards station B through the low-pass filters $LP_A$, $LP_1$, $LP_2$, $LP_B$. When it is desired to locate the position of a fault in the cable, say in the section of the cable to the right of the intermediate amplifier illustrated in Fig. 2, a relay contact $C_2$ is closed to place a frequency changer NR across the line leading to high-pass filter $HP_1$. The 30 kilocycle per second pulses which pass to the fault via low-pass filter $LP_2$ and hybrid coil $HBC_1$ are reflected from the fault and, by the action of the frequency changer NR, are converted to a frequency in the frequency band which can pass freely through the filters $HP_1$, $HP_2$ and $HP_A$.

The reflected energy from the fault thus passes back to station A and via amplifier FSA to the oscillograph CRO by means of which the time-delay which has occurred between transmission of a 30 kilocycle pulse and reception of the reflected signal is indicated. From this time-delay the position of the fault can be calculated in known manner. The reflected signal is, of course, amplified by each intermediate amplifier through which it passes.

Figure 4:
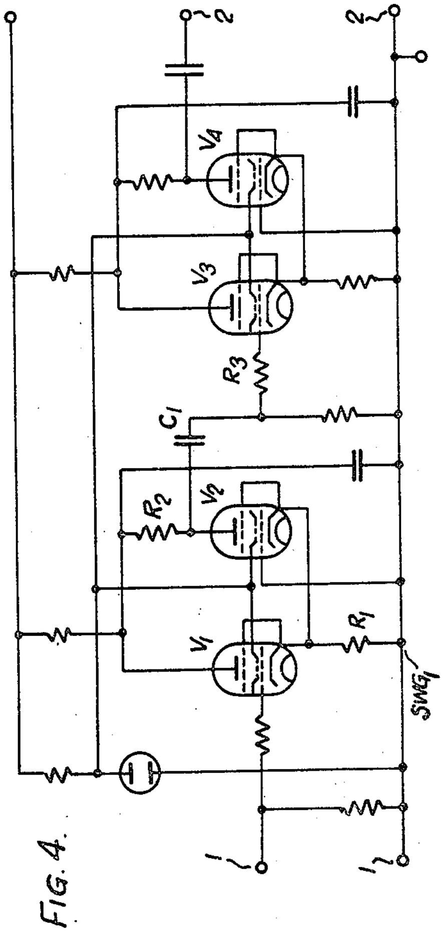
Fig. 4 shows the circuit arrangement of a suitable square wave generator.

Referring more particularly to Fig. 4, the output from oscillator $O_2$ which is of conventional design is applied to input terminals 1, 1 and to the grid of a pentode valve $V_1$ of square wave generator $SWG_1$. The cathode of this valve $V_1$ is connected to earth via resistance $R_1$ and directly to the cathode of a similar valve $V_2$. The grid of valve $V_2$ is earthed. The screen grids of valves $V_1$ and $V_2$ are connected together and to a suitable source of potential. A resistance $R_2$ is connected in the anode circuit of valve $V_2$ and the valve output applied via condenser $C_1$ and resistance $R_3$ to the grid of valve $V_3$ of a pair of valves $V_3$ and $V_4$ which are arranged in similar fashion to valves $V_1$ and $V_2$.

When a positive signal is applied to the grid of valve $V_1$ the current through $R_1$ is increased and the anode current of valve $V_2$ is decreased. When the signal has reached a certain positive value the anode current has decreased to zero and a further increase in signal can produce no further reduction in anode current in valve $V_2$. Similarly if the signal applied to valve $V_1$ is negative the anode current of valve $V_2$ is increased. When the signal reaches the point at which valve $V_1$ has cut off no further increase in the anode current of valve $V_2$ is possible. The output signal from the anode of valve $V_2$ therefore approaches a signal wave-form and by repeating the process through valves $V_3$ and $V_4$, the output from terminals 2, 2 can be made to have a wave form substantially as shown at $W_1$ in Fig. 7.

Square wave generator $SWG_2$ is similar to generator $SWG_1$ but in this generator it is preferred to provide means for applying via a bias battery and potentiometer, a variable bias voltage to the grid of valve $V_2$ so that the operating point on the characteristic of this valve can be adjusted if necessary to make the positive and negative half cycles of the wave form more nearly equal to one another. The input to the generator $SWG_2$ is delivered from oscillator $O_2$ via a phase changer PC as shown in Fig. 5 by means of which the square wave shown at $W_2$ in Fig. 7 is arranged to be not quite 180° out of phase with the wave $W_1$. The phase changer PC which comprises a pentode valve $V_5$ is provided with a potentiometer $P_1$, in series with condenser $C_2$, by adjustment of which the length of the pulse shown at $W_3$ in Fig. 7 may be controlled. Adjustment of potentiometer $P_2$ controls the amplitude of the 100 cycles per second input to square wave generator $SWG_2$ which is connected to output terminals 3, 3 of the phase changer.

Figure 6:
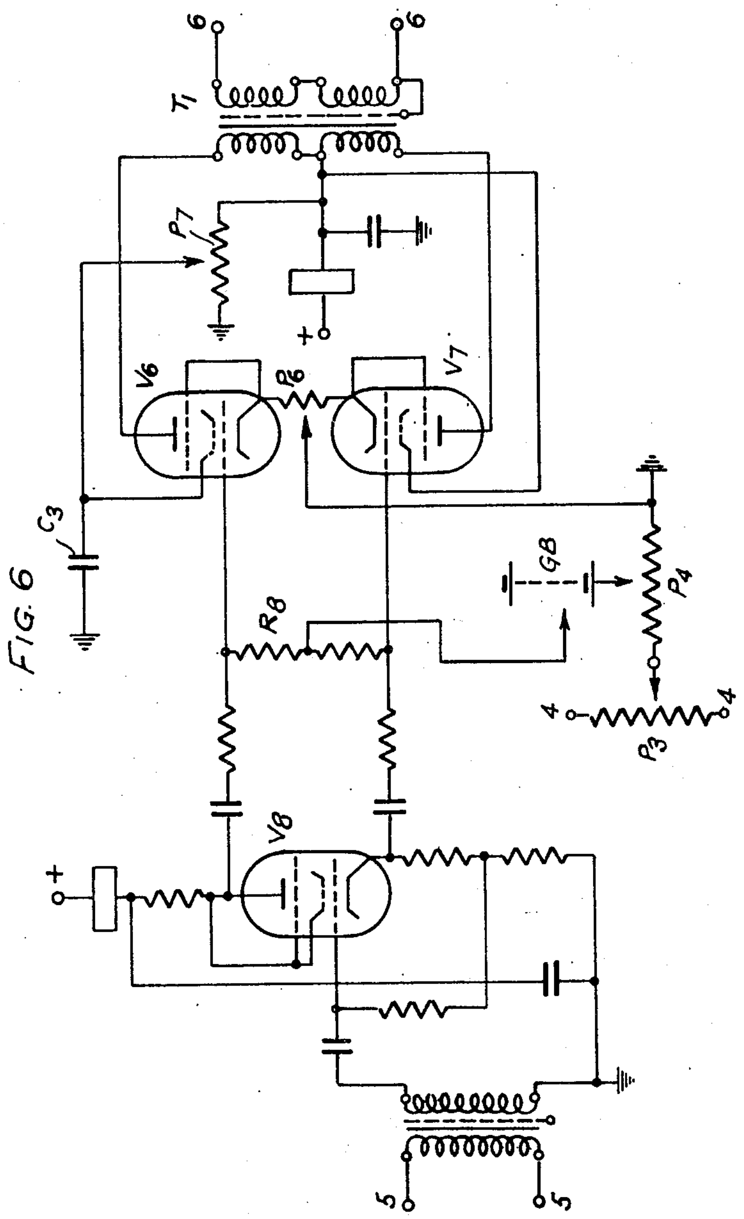
Fig. 6 is a circuit diagram of a switching modulator.

The output of the square wave generators $SWG_1$ and $SWG_2$ is applied to terminals 4, 4 of potentiometer $P_3$ of the modulator shown in Fig. 6. The movable contact of potentiometer $P_3$ is connected to one terminal of potentiometer $P_4$, the other terminal of which is earthed. The movable contact of potentiometer $P_4$ is connected to grid bias battery GB which is connected via the mid-point of resistance $R_8$ with the grids of two pentode valves $V_6$, $V_7$ in push-pull.

The output of the 30 kilocycles per second oscillator $O_1$ is applied to input terminals 5, 5 of the modulator and the grid of a valve $V_8$ which is connected across the grids of valves $V_6$ and $V_7$.

The cathodes of valves $V_6$ and $V_7$ are connected to potentiometer $P_6$, the movable contact of which is connected to earth.

The anodes of the valves $V_6$ and $V_7$ are connected to the primary of output transformer $T_1$ the centre tapping of which is earthed via potentiometer $P_7$, the movable contact of which is connected to the screen grid of valve $V_6$ and, via condenser $C_3$ to earth. Potentiometers $P_6$ and $P_7$ are provided to enable the push-pull stage to be balanced. Potentiometer $P_4$ enables the amplitude of the pulse to be controlled while potentiometer $P_3$ is provided to enable the successive square waves to be made equal in amplitude.

The arrangement shown is such that the output of the modulator is zero except during the duration of the positive pulses.

The pulse output of the modulator SM is applied via output terminals 6, 6 to a single stage amplifier PSA indicated in Fig. 3 and thence to line L.

The 30 kilocycle per second pulses thus transmitted to line L pass through each repeater R to station B. As stated above pulses reflected from a fault in the cable are passed back to the station A and to pulse receiver PR. They are received by amplifier FSA, tuned to receive the particular frequency reflected from a fault. The output circuit of the amplifier FSA is connected in conventional manner with the oscillograph CRO. As will be understood the oscillograph arranged as referred to above displays the received pulses as a number of spaced signals located on a linear time base according to the distance of the fault from the station A.

In the case of station B, should this station be fitted with pulse transmitting and receiving apparatus the apparatus described with reference to station B has to be modified. As station B sends over the upper frequency band of 72 and 120 kilocycles per second it is now not possible with the system arranged as described to transmit pulses at one frequency and receive pulses at a harmonic frequency. Consequently station B is provided with two oscillators $O_3$ and $O_4$ to produce sine waves of 80 kilocycles per second and 110 kilocycles per second respectively and the oscillator $O_5$ to provide the 100 cycle per second sine wave as in station B. A pulse generator PG arranged as the generator at station A is provided and two modulators $SM_2$ and $SM_3$ arranged for the modulation of the waves from oscillators $O_3$ and $O_4$. The resultant pulses at 80 and 110 kilocycles per second are transmitted to line L and to amplifiers RA. When the position of a fault in the cable is to be located from station B relay contact $C_1$ (see Fig. 2) is closed and frequency changer $NR_1$ is placed in circuit. This frequency changer produces a new pulse at frequency $2\times80-110=50$ kilocycles per second which, after reflection from the fault to the left of amplifier RA is transmitted back to station B by way of the low pass filters $LP_1$, $LP_2$ and $LP_B$ to a pulse receiver PR at station B which receiver is arranged in like manner to that at station A, the receiving amplifier in this case being tuned broadly to 50 kilocycles per second. The duration of the transmitted pulses are suitably the same as described with reference to station A.

Figure 2:
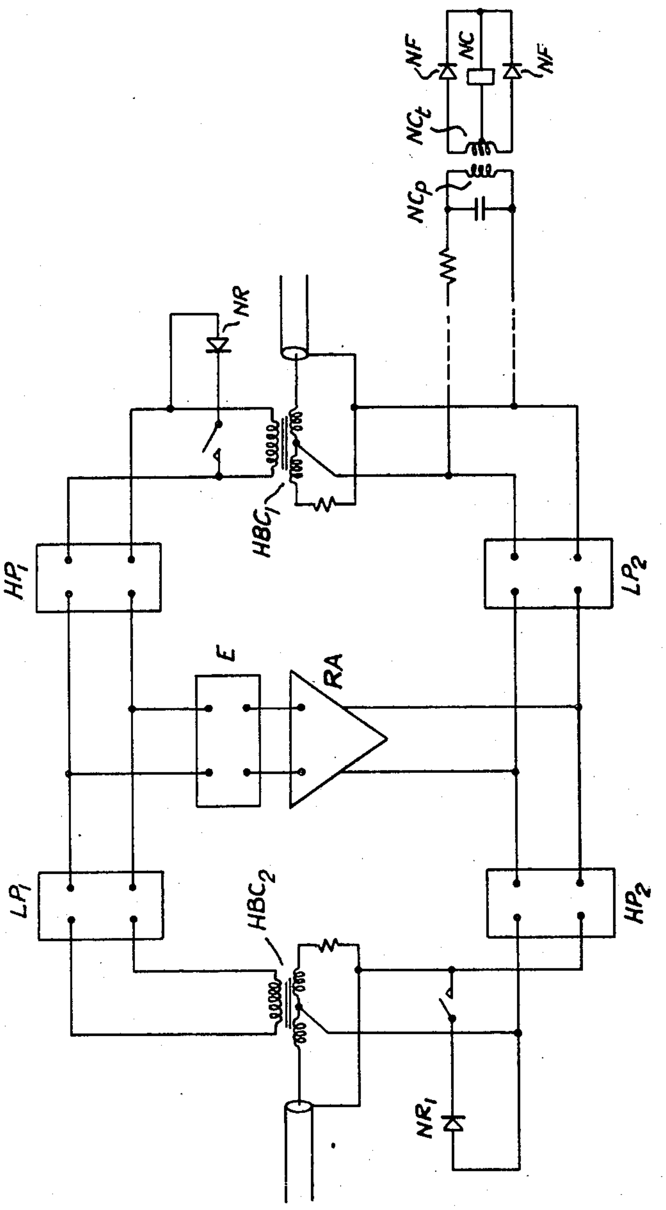
Fig. 2 is a block schematic diagram of an intermediate amplifier and associated filter networks together with an arrangement for switching a non-linear resistance device to the system.

As shown in Fig. 2 the up side of the cable is connected to an intermediate repeater by a hybrid coil $HBC_2$ and the DN side cable is connected by a hybrid coil $HBC_1$ to the output side of the repeater. Should a fault occur on the cable to the right of the repeater in Fig. 2, that is between the repeater of Fig. 2 and the next succeeding repeater to the right, the relay contact $C_2$ is closed by a signal transmitted from station A to a tuned circuit including primary transformer winding $NC_p$, the secondary winding $NC_t$ being connected to relay operating winding NC via rectifier NF. In one preferred arrangement the relay is of the type which releases slowly after the operating signal has been removed so that the fault location can be carried out by transmitting the pulse signal in the absence of the relay operating signal. The arrangement is such that one relay contact such as $C_2$ only is closed at a time. Closure of contact $C_2$ places frequency changer NR in circuit so by the arrangement referred to one frequency changer only is connected to the system when a fault is to be located, the selection of the particular repeater station at which the appropriate frequency changer is to be connected being made by connecting each in turn until a reflected signal is received at station A. When frequency changer NR has been placed in circuit, energy reaching the fault when a pulse is transmitted from station A is reflected back and a portion is converted by the frequency changer into the desired higher frequency, in the arrangement described, to a frequency of 90 kilocycles per second. The hybrid coil $HBC_1$ may exclude completely the 30 kilocycle pulses from station A from the frequency changer NR but in a desirable arrangement the hybrid coil may be arranged to permit some of the energy at the 30 kilocycle per second frequency to leak to the frequency changer. This leakage of 30 kilocycle energy will then, after conversion to 90 kilocycles per second, provide a "marker" pulse at the station A and the time delay between the "marker" pulse and the pulse reflected from the fault will give the distance of the fault from repeater RA.

The frequency changer NR is shown at a position A in Fig. 2 but it may also be placed at position B, in which case the pulse transmitted from station A is raised to the higher frequency before it reaches the fault. Otherwise the behaviour of the circuit is as described when the frequency changer is located at position A.

When a complex pulse is transmitted from station B to locate a fault to the left of repeater RA of Fig. 2, frequency changer $NR_1$ is placed in circuit. As shown in Fig. 2, frequency changer $NR_1$ is in position C and its behaviour is similar to that described with reference to frequency changer NR in position A. Frequency changers $NR_1$ may also be placed at position D when its behaviour is similar to that described with reference to frequency changers NR in position A. Position C is preferred to position D for frequency changer $NR_1$ because position C is a point of higher signal level than position D which facilitates the frequency changing operation. In addition the attenuation of the cable to pulses at the frequency produced by the frequency changers is lower than the attenuation at the frequencies transmitted from station B.

The frequency changers NR and $NR_1$ may be non-linear elements, i. e. elements having a non-linear voltage-current characteristic or 4-terminal networks may be used. The hybrid coils may be replaced by other known devices which are responsive to the direction of transmission. The frequency changers employed should be highly efficient devices, i. e. they should be capable of converting a large part of the energy supplied to them at one frequency to the desired other frequency.

Various types of non-linear devices may be employed including diode valves, metal rectifiers and silicon carbide resistors. A form of silicon carbide marketed under the name "Atmite" may be used.

Figure 8:
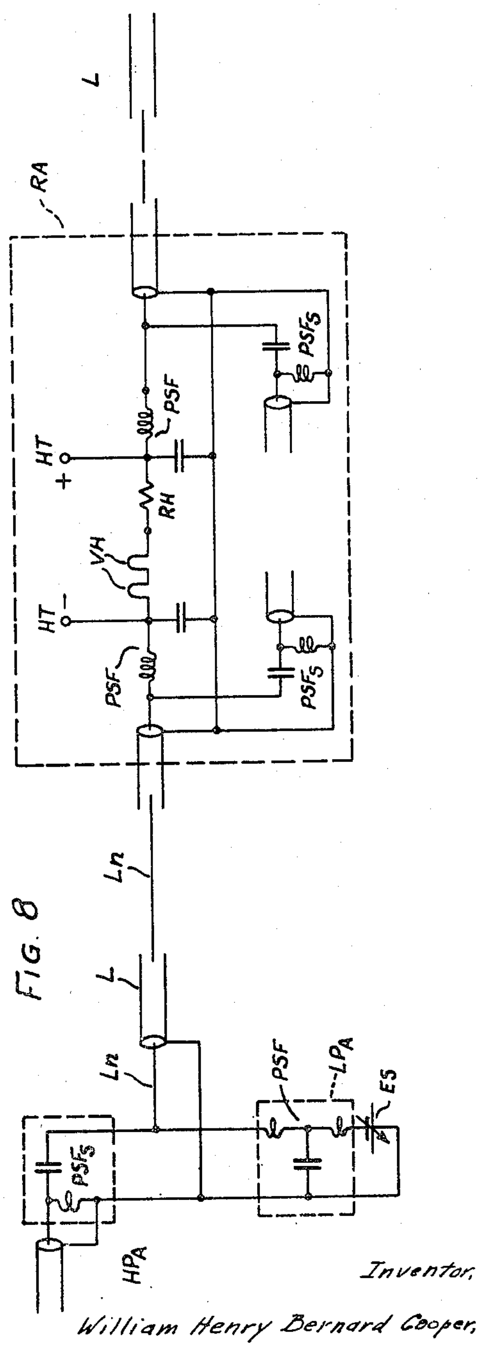
Fig. 8 illustrates diagrammatically an arrangement for maintaining the essential part of a submerged cable working for the purpose of locating a fault.

The arrangement shown diagrammatically in Fig. 8 is provided to enable the essential part of a submerged cable to be maintained working for the purpose of locating a fault.

Terminal station A is arranged as described above and is connected to a coaxial cable L having an insulated conductor L*n*. To the insulated conductor L*n* is connected a power supply source ES which is arranged so that its voltage may be adjusted or to deliver a constant current. The source ES may be a battery, variable voltage generator or a constant current generator.

Power supply filters PSF and $PSF_s$ are arranged as shown. The filters $PSF_s$ at the repeaters RA are connected at the input and output sides of the normal filtering and amplifying circuits.

The valve heaters VH of the valves of the repeater RA are connected in series in the conductor L*n* and the voltage drop across the heaters VH is employed to provide the anode current supply for the valves of the repeater. A resistance RH may be inserted in series with the heaters VH where necessary. In the case of a submerged cable a relatively low resistance connection, provided by a fault, between the insulated conductor and the sea will not seriously interfere with the flow of the power feed current provided by the arrangement shown, the precise desired value of this current being obtainable by adjustment of the source ES or from the constant generator.

A similar power supply arrangement may be provided at station B.

I claim:

1. In a communication system and in combination attended stations, a plurality of unattended repeater stations separated from said attended stations and from each other, a transmission line joining said attended stations and said unattended stations, a tube amplifier at each of said unattended repeater stations, frequency selective paths at each of said unattended repeater stations arranged to direct signal currents at frequencies in a lower band to pass in one direction and signal currents at frequencies in an upper band to pass in the opposite direction along said line and through each of said unattended repeater stations, a pulse generator at an attended station, means at the said attended station for applying a pulse signal current from said generator at a determined frequency to said transmission line, frequency changing means, switching means for connecting said frequency changing means at will to said transmission line between a frequency selective path at an unattended repeater station and the next succeeding frequency selective path in the transmission line, a signal receiver at the last-mentioned attended station for receiving currents reflected from a fault located in said transmission line and amplified at said last-mentioned unattended repeater station to observe the time difference between the transmission of a pulse signal current and the reception of current reflected from the said fault.

2. In a communication system and in combination attended stations, a plurality of unattended repeater stations separated from said attended stations and from each other, a transmission line joining said attended stations and said unattended repeater stations, a tube amplifier at each of said unattended repeater stations, frequency selective paths at each of said unattended repeater stations arranged to direct signal currents at frequencies in a lower band to pass in one direction and signal currents at frequencies in an upper band to pass in the opposite direction along said line and through each of said unattended repeater stations, a pulse generator at an attended station, means at the said attended station for applying a pulse signal current from said generator at a determined frequency to said transmission line, a plurality of frequency changing means, switching means at said attended station for connecting a frequency changing means to said transmission line between a frequency selective path at an unattended repeater station and the next succeeding frequency selective path in the transmission line, a signal receiver at the last-mentioned attended station for receiving currents reflected from a fault located in said transmission line and amplified at said last-mentioned unattended repeater station and means at said last-mentioned attended station to observe the time difference between the transmission of a pulse signal current and the reception of current reflected from the said fault.

3. In a communication system as claimed in claim 1, means at each unattended repeater station for diverting part of the transmitted pulse signal current from the line between an unattended repeater station adjacent to a fault in the line and means at the attended station for observing the time difference between the reception of the diverted current and current reflected from the said fault.

4. In a communication system as claimed in claim 2, means at each unattended repeater station for diverting part of the transmitted pulse signal current from the line between an unattended repeater station adjacent to a fault in the line and means at the attended station for observing the time difference between the reception of the diverted current and current reflected from the said fault.

5. In a communication system and in combination attended stations, a plurality of unattended repeater stations separated from said attended stations and from each other, a transmission line joining said attended stations and said unattended repeater stations, a tube amplifier at each of said unattended repeater stations, frequency selective paths at each of said unattended repeater stations arranged to direct signal currents at frequencies in a lower band to pass in one direction and signal currents at frequencies in an upper band to pass in the opposite direction along said line and through each of said unattended repeater stations, pulse generating means at an attended station, means at the said attended station for applying simultaneously pulse signal currents from said generating means at different determined frequencies to said transmission line, frequency changing means, switching means for connecting said frequency changing means at will to said transmission line between a frequency selective path at an unattended repeater station and the next succeeding frequency selective path in the transmission line, a signal receiver at the last-mentioned attended station for receiving currents reflected from a fault located in said transmission line and amplified at said last mentioned unattended repeater station and means at said last-mentioned attended station to observe the time difference between the transmission of a pulse signal current and the reception of current reflected from the said fault.

6. In a communication system and in combination attended stations, a plurality of unattended repeater stations separated from said attended stations and from each other, a transmission line joining said attended stations and said unattended repeater stations, a tube amplifier at each of said unattended repeater stations, frequency selective paths at each of said unattended repeater stations arranged to direct signal currents at frequencies in a lower band to pass in one direction and signal currents at frequencies in an upper band to pass in the opposite direction along said line and through each of said unattended repeater stations, pulse generating means at an attended station, means at the said attended station for applying simultaneously pulse signal currents from said generating means at different determined frequencies to said transmission line, a plurality of frequency changing means, switching means at said attended station for connecting a frequency changing means to said transmission line between a frequency selective path at an unattended repeater station and the next succeeding frequency selective path in the transmission line, a signal receiver at the last-mentioned attended station for receiving currents reflected from a fault located in said transmission line and amplified at said last-mentioned unattended repeater station and means at said last-mentioned attended station to observe the time difference between the transmission of a pulse signal current and the reception of current reflected from the said fault.

7. In a communication system as claimed in claim 5 means at each unattended station for diverting part of the transmitted pulse signal energy from the line between an unattended repeater station adjacent to a fault in the line and means at the attended station for observing the time difference between the reception of a signal corresponding to the diverted current and a signal produced by current reflected from the said fault.

8. In a communication system as claimed in claim 6 means at each unattended station for diverting part of the transmitted pulse signal energy from the line between an unattended repeater station adjacent to a fault in the line and means at the attended station for observing the time difference between the reception of a signal corresponding to the diverted energy and a signal produced by current reflected from the said fault.

9. A communication system as claimed in claim 2 wherein the attended station other than that attended station which is provided with pulse generating means for generating a pulse signal current at a determined frequency is provided with pulse generating means for generating a pulse signal current at different determined frequencies and with means for applying said different frequencies to the transmission line, the system further comprising an additional plurality of frequency changing means and switching means at said other attended station for connecting said additional frequency changing means at will to the transmission line between a frequency selective path at an unattended repeater station and the next succeeding frequency selective path in the transmission line.

10. A communication system as claimed in claim 3 comprising a tube amplifier at each unattended repeater station having heaters and anodes, an electrical current source at the attended station provided with a pulse generator, said heaters being connected in series in the transmission line, and means connecting the anodes across the heaters.

11. A communication system as claimed in claim 6 comprising a tube amplifier at each unattended repeater station having heaters and anodes, an electrical current source at the attended station provided with pulse generating means, said heaters being connected in series in the transmission line, and means connecting the anodes across the heaters.

12. The method of locating a fault on a long transmission line connecting terminal stations and including at least one intermediate amplifier station, which comprises connecting a frequency changing means at the last intermediate amplifying station between a terminal station and the fault, transmitting from that terminal station a pulse signal along the line, conducting current reflected from the fault to the frequency changing means, changing the frequency of the current reflected from the fault, conducting the current of changed frequency to the transmitting terminal station after amplification and measuring the time difference between transmission of the pulse signal and reception of the amplifier current of changed frequency.

WILLIAM HENRY BERNARD COOPER.

REFERENCES CITED

The following references are of record in the file of this patent:

UNITED STATES PATENTS

| Number | Name | Date |
|---|---|---|
| 1,481,831 | Demarest | Jan. 29, 1924 |
| 2,020,297 | Buckley | Nov. 12, 1935 |
| 2,020,316 | Jacobs | Nov. 12, 1935 |
| 2,159,597 | Miller | May 23, 1939 |
| 2,208,417 | Gilbert | July 16, 1940 |
| 2,237,668 | Hermann | Apr. 8, 1941 |
| 2,260,160 | Benning | Oct. 21, 1941 |
| 2,315,383 | Andrews | Mar. 30, 1943 |
| 2,315,435 | Leibe | Mar. 30, 1943 |
| 2,315,450 | Nyquist | Mar. 30, 1943 |
| 2,321,723 | Zinn | June 15, 1943 |
| 2,345,932 | Gould | Apr. 4, 1944 |